F. C. NEELY.
STANCHION.
APPLICATION FILED FEB. 19, 1917.

1,270,314.

Patented June 25, 1918.

WITNESSES

INVENTOR
Frank C. Neely
BY
ATTORNEY

UNITED STATES PATENT OFFICE.

FRANK C. NEELY, OF CLARINDA, IOWA.

STANCHION.

1,270,314.

Specification of Letters Patent.   Patented June 25, 1918.

Application filed February 19, 1917.   Serial No. 149,559.

*To all whom it may concern:*

Be it known that I, FRANK C. NEELY, a citizen of the United States, residing at Clarinda, in the county of Page and State of Iowa, have invented certain new and useful Improvements in Stanchions, of which the following is a specification.

My invention relates to restraining devices and more particularly to an improved stanchion and has as its principal object to provide a device of this general character which is automatically operated to operative position and which will permit the animal to move its head up and down with comfort and yet will positively prevent the same from releasing its head.

A second object is to provide an improved stanchion having a novel latching means for retaining the movable parts in like position to restrain the animals.

Another important object of my invention is to provide a stanchion which consists of a plurality of movable bars which are simultaneously moved into operative or inoperative position.

Still a further object of the invention is to provide a novel mechanism for controlling the movement of movable bars and latch mechanism.

An additional object is to provide a restraining device of this general character which is efficient and effective in use and consists of few simple elements is inexpensive in manufacture and which may be placed on the market at a minimum cost.

The above and other objects will be set forth in detail in the following specification and the inventive idea claimed therein.

Figure 1:
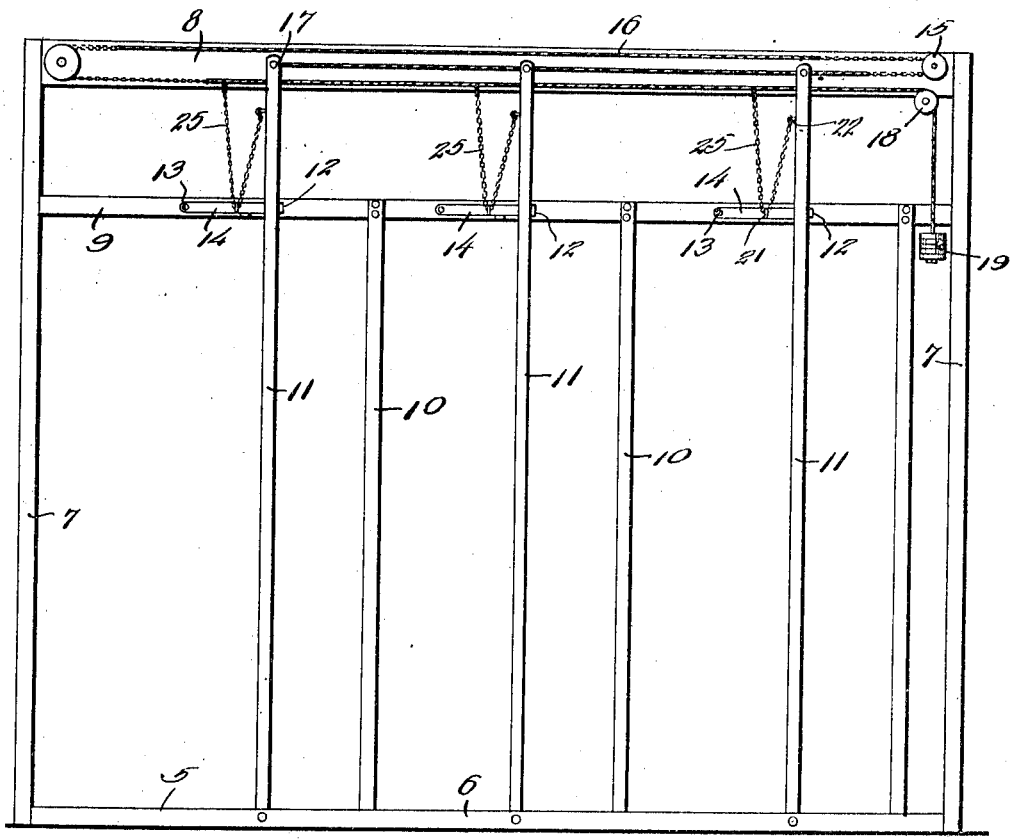
Figure 2:
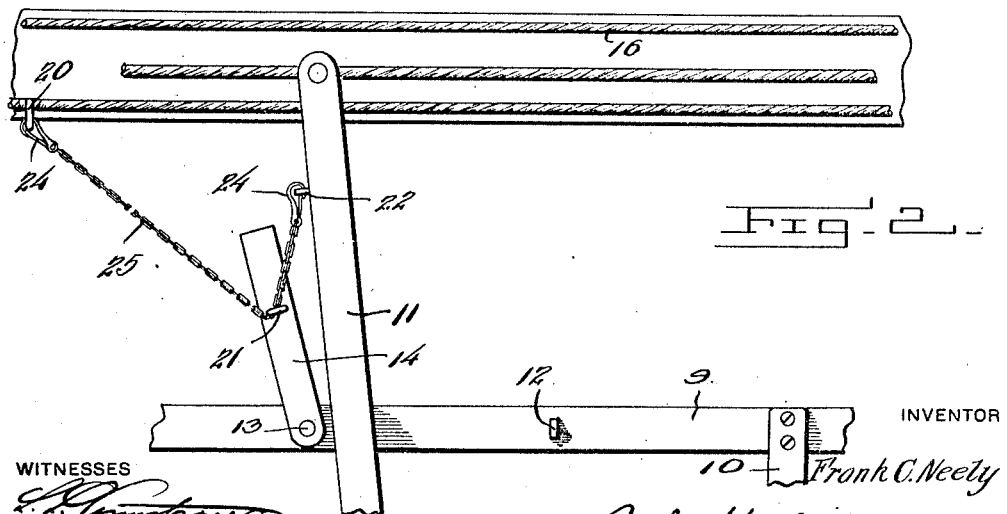

The invention consists of the construction and arrangement of coacting parts and the operations which will be explicitly described in the following description and illustrated in the accompanying drawings in which, Figure 1 is a front view of the stanchion or a restraining device constructed in accordance with my invention and, Fig. 2 is a view of certain of the operating details and showing one of the latches and one of the movable bars in inoperative position.

On the drawings in which like characters indicate like parts the numeral 5 designates a frame in general which consists of a bottom horizontal bar 6 and end vertical bars 7 to which are connected an upper horizontal bar 8. Connected with the vertical bar 7 below the bar 8 is a second horizontal bar 9 which is adapted to limit the upward movement of the animal's head.

Connected with the bars 6 and 9 are rigid restraining bars 10 which are secured to these cross bars by any suitable fastening, these rigid restraining bars 10 are arranged in parallelism and in spaced relation.

Pivotally connected with the bar 6 and arranged in spaced relation thereon is a plurality of movable restraining bars 11 which extend upwardly and lie adjacent the upper cross bars 8. These bars 11 when in operative position are adapted to embrace one side of the animal's neck.

Extending outwardly from the bar 9 are lugs or abutments 12 which are adapted to limit the movement of the movable restraining bars 11 in one direction. Pivotally mounted on the bar 9 as at 13 is a plurality of latch members 14 which are adapted to engage one of the longitudinal faces of each of the movable bars 11 and retain the same against movement, this being clearly shown in Fig. 1. The inoperative position of these latch members 14 is shown in Fig. 2.

Mounted on a bar 8 adjacent its ends are pulleys or sheaves 15 around which passes a cable, rope, chain or other flexible element 16 which has one of its extremities connected with each of the movable bars 11 at the upper end thereof, this being indicated by the numeral 17. The opposite end of this flexible element 16 extends in parallel relation with the cross bar 8 and over the pulley or sheave 18 and has a weight 19 attached thereto. The normal tendency of this weight is to retain the movable bars 11 in extreme vertical position and against the lugs or abutments 12.

Carried by the flexible element 16 is a plurality of eyes 20. Eyes 21 and 22 are also carried by the latch members 14 and the movable bars 11. Extending through the eyes 21 and engaging the eyes 20 and 22 are snap hooks 24 carried by the chain or other flexible element 25. This chain 25 controls the movement of the latch members.

The operation of my improved stanchion, is as follows.

Each of the animals has its head extended between the stationary bars 10 and the movable bars 11, which movable bars are now in a position shown in Fig. 2, which is caused by moving that portion of the cable 16 which has a chain 25 attached thereto, toward the left hand end of the frame 5 which moves the weight 19 upwardly. This weight is now released to move downwardly and upon the lowering of the same the bars 11 will be moved to the position shown in Fig. 1 and at the same time the chain and flexible elements passing through the eyes 21 will cause the latch members to assume a horizontal or locked position.

While the above disclosure is now considered to be the preferred embodiment of the invention it is to be understood that the inventive idea may be carried out in constructions other than the one disclosed which I may be entitled to and which may be clearly embodied in the scope of the appended claims.

What is claimed is:

1. In a stanchion, a frame, a plurality of vertical rigid bars mounted thereon, a cross bar mounted on the frame adapted to limit the upward movement of the animal's head, a plurality of movable bars pivotally mounted on the frame, pulleys mounted on the frame, a flexible element passing around the pulleys and operatively connected with the movable bars, a third pulley mounted on the frame around which the extremity of the flexible element passes, a weight carried by the flexible element, latch members pivotally mounted on the cross bar, flexible elements detachably connected with the first named flexible element and the moving bars and having sliding engagement with the latch members.

2. A stanchion including a frame comprising stationary and swinging bars, stops limiting the movement of said swinging bars in one direction, pivoted latches adapted to limit the movement of said swinging bars in the opposite direction, auxiliary cables connected to said latches and swinging bars, a main actuating cable operatively connected with said auxiliary cables and with said swinging bars, and a weight secured to said main cable.

3. A stanchion including a frame comprising stationary and swinging bars, a plurality of pulleys, a main actuating cable trained over said pulleys and having one end connected to said swinging bars, a weight connected to the opposite end of said main cable, and a plurality of auxiliary cables forming a connection between said main cable and said latches and swinging bars.

4. A stanchion, including a frame comprising a plurality of stationary bars, a plurality of swinging bars, stops carried by the frame and engaging one side of said swinging bars, pivotally mounted latches carried by the frame and engaging the opposite sides of said swinging bars, eyes carried by said latches, a plurality of pulleys carried by the frame, a main actuating cable carried by said pulleys and having one of its ends secured to said swinging bars, a weight secured to the opposite end of said main cable, and a plurality of auxiliary cables having their opposite ends connected respectively to said swinging bars and said main cable and having their intermediate portions passing through the eyes carried by said latches.

In testimony whereof I affix my signature in presence of two witnesses.

FRANK C. NEELY.

Witnesses:
F. E. FINLEY,
A. A. OTTE.

Copies of this patent may be obtained for five cents each, by addressing the "Commissioner of Patents, Washington, D. C."